United States Patent
Takeuchi et al.

(10) Patent No.: US 7,106,484 B2
(45) Date of Patent: Sep. 12, 2006

(54) SCANNING OPTICAL SYSTEM

(75) Inventors: Shuichi Takeuchi, Saitama-ken (JP); Takashi Iizuka, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/890,232

(22) Filed: Jul. 14, 2004

(65) Prior Publication Data
US 2005/0024702 A1 Feb. 3, 2005

(30) Foreign Application Priority Data
Jul. 15, 2003 (JP) ............................. 2003-274753

(51) Int. Cl.
*G02B 26/08* (2006.01)

(52) U.S. Cl. .................. 359/207; 359/204; 347/244; 347/258

(58) Field of Classification Search ........ 359/204–206, 359/216, 207, 208, 244, 258; 347/233–234, 347/241–244
See application file for complete search history.

(56) References Cited

U.S. PATENT DOCUMENTS

| | | | | |
|---|---|---|---|---|
| 4,390,235 A | * | 6/1983 | Minoura | 359/204 |
| 4,644,160 A | | 2/1987 | Arimoto et al. | |
| 4,863,227 A | * | 9/1989 | Takanashi | 359/207 |
| 5,469,290 A | * | 11/1995 | Maeda | 359/210 |
| 5,856,879 A | | 1/1999 | Suzuki et al. | |
| 2002/0167680 A1 | * | 11/2002 | Sakurai | 358/1.9 |
| 2003/0063355 A1 | * | 4/2003 | Suzuki et al. | 359/196 |
| 2003/0128270 A1 | * | 7/2003 | Kato | 347/233 |

FOREIGN PATENT DOCUMENTS

| | | |
|---|---|---|
| JP | 57-54914 | 4/1982 |
| JP | 60-126620 | 7/1985 |

* cited by examiner

*Primary Examiner*—Mark A. Robinson
*Assistant Examiner*—Pranav Khatri
(74) *Attorney, Agent, or Firm*—Greenblum & Bernstein, P.L.C.

(57) ABSTRACT

An scanning optical system includes a light source having a plurality of light emitting points each of which emits a beam, a first optical system that collimates the beams emitted by the light emitting points in regard to a main scanning direction while converging the beams in an auxiliary scanning direction, a deflecting system that dynamically deflects the beams simultaneously in the main scanning direction, and a second optical system that converges the deflected beams on the scan target surface. Further, the second optical system includes a magnification adjustment element whose magnification mS in the main scanning direction on an optical axis thereof is approximately +1 and whose magnification mP in the auxiliary scanning direction on the optical axis thereof is approximately −1.

8 Claims, 5 Drawing Sheets

SCANNING OPTICAL SYSTEM

BACKGROUND OF THE INVENTION

The present invention relates to a scanning optical system in which a plurality of beams emitted by multiple light emitting points are dynamically deflected and converged on a scan target surface to form a plurality of beam spots.

By a scanning optical system of this type, a plurality of scan lines can be drawn simultaneously on the scan target surface in one main scanning. By modulating each of the beams according to image information, high-speed imaging is realized.

As a light source for such a scanning optical system, either a single element having a plurality of light emitting points as disclosed in Japanese Patent Provisional Publication No. SHO57-54914 or multiple elements each having a single light emitting point as disclosed in Japanese Patent Provisional Publication No. SHO60-126620 can be used.

However, with either type of light source, if the interval between the beams on the scan target surface is not adjusted precisely (to be equal to moving distance of the scan target surface in one main scan by a reflecting surface divided by the number of beams), the scan line interval on the scan target surface becomes uneven (that is, the interval between scan lines simultaneously drawn becomes inconsistent with the interval between scan lines drawn by different main scans) as described in the Publication No. SHO57-54914, and in such a case, the quality of printed images is deteriorated. Therefore, the interval between the beams on the scan target surface has to be adjusted correctly.

When the multiple light emitting elements are used as in the scanning optical system of the Publication No. SHO60-126620, the beam interval on the scan target surface can be corrected by changing the positional relationship among the elements. However, the movement of the element is magnified by transverse magnification of the whole optical system, resulting in a shift of the beam on the scan target surface (shift in the auxiliary scanning direction which is orthogonal to the direction of the scan lines). Therefore, the adjustment of each light emitting element, requiring extremely high accuracy, can not be done easily by a nonexpert.

Meanwhile, when a single light emitting element having a plurality of light emitting points is used as in the scanning optical system of the Publication No. SHO57-54914, the interval between the light emitting points may be fixed at its design interval. However, if the interval between the beams deviates from a design interval due to magnification error of the whole optical system caused in the manufacturing process (e.g., an error in the relationship of the light emitting element with other optical elements), it is impossible to correct the beam interval by adjusting the interval between the light emitting points of the element. Therefore, in such a case, the beam interval on the scan target surface is corrected by adjusting the magnification of the whole optical system by placing an afocal anamorphic zoom lens system (composed of three lens groups as described in the Publication No. SHO57-54914) between a collimating lens and a cylindrical lens. However, such an afocal anamorphic zoom lens system, which is originally unnecessary for the function of the scanning optical system, drives up the cost of the system.

Incidentally, when such a single light emitting element having a plurality of light emitting points is employed, it is also possible to adjust the interval between the scan lines on the scan target surface by rotating the light emitting element in a plane containing the light emitting points. However, the rotation of the light emitting element naturally causes a change in the interval between the light emitting points in the main scanning direction, by which extra adjustment such as readjustment of emission timing of each light emitting point becomes necessary. Further, the rotation of the light emitting element also causes rotation of the far field pattern of the beams, accompanied by problems such as a change in coupling efficiency.

SUMMARY OF THE INVENTION

The present invention is advantageous in that an improved scanning optical system is provided, with which the interval between the beam spots on the scan target surface can be adjusted properly only by moving a lens that is necessary for the original function of the scanning optical system, without the need of introducing an extra lens or rotating the light emitting element.

According to an aspect of the invention, there is provided an improved scanning optical system for scanning a plurality of beams, which are arranged in an auxiliary scanning direction, on a scan target surface in a main scanning direction. The scanning optical system includes a light source having a plurality of light emitting points each of which emits a beam, a first optical system that collimates the beams emitted by the light emitting points in regard to the main scanning direction while converging the beams in the auxiliary scanning direction, a deflecting system that dynamically deflects the beams simultaneously in the main scanning direction, and a second optical system that converges the deflected beams on the scan target surface. Further, the second optical system includes a magnification adjustment element whose magnification mS in the main scanning direction on an optical axis thereof is approximately +1 and whose magnification mP in the auxiliary scanning direction on the optical axis thereof is approximately −1.

Optionally, the magnification adjustment element may be configured to be movable in the direction of the optical axis.

Further optionally, the magnification mS may satisfy:

$0.80 < mS < 1.15.$

Further, the magnification mP may satisfy:

$-1.15 < mP < -0.80.$

Still optionally, the magnification adjustment element may be placed nearest to the scan target surface among optical elements of the second optical system.

Further optionally, the second optical system may include a first lens having refractive power for converging each beam mainly in the main scanning direction and a second lens as the magnification adjustment element.

In a particular case, the magnification adjustment element may be implemented by a lens having a rotationally symmetric aspherical front surface and an anamorphic aspherical rear surface.

In another case, the magnification adjustment element may be a lens having an anamorphic aspherical front surface and a rotationally symmetric aspherical rear surface.

DESCRIPTION OF THE EMBODIMENTS

Figure 1:
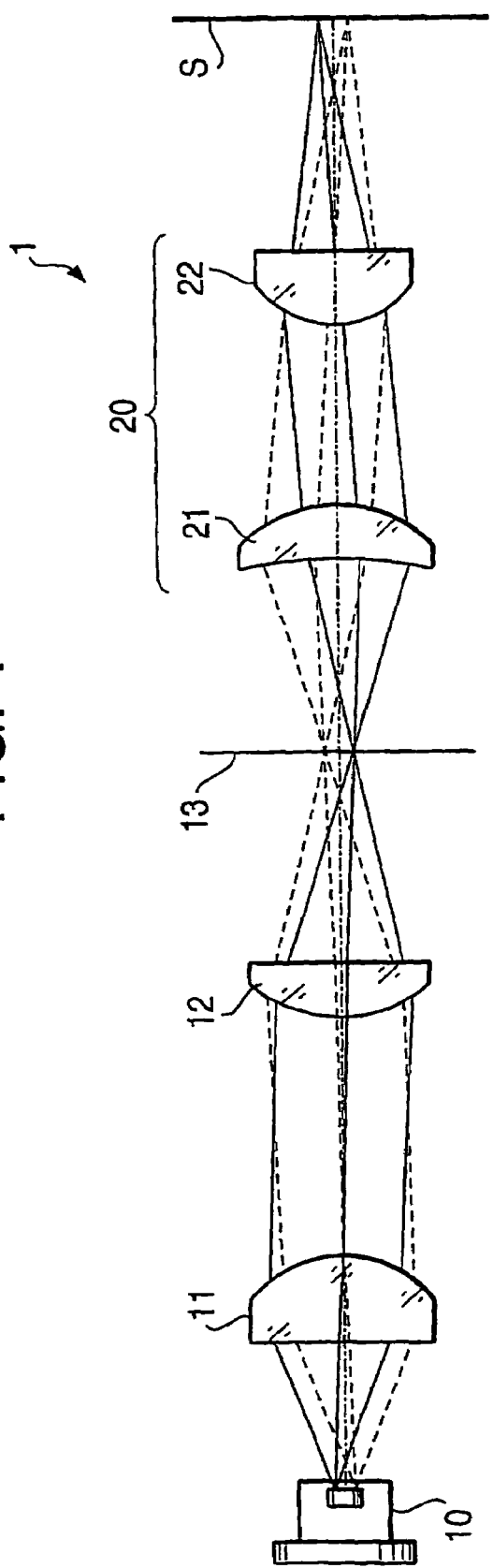
FIG. 1 schematically shows a composition of a scanning optical system in accordance with an embodiment of the present invention seen in a main scanning direction.

Referring now to the drawings, a description will be given in detail of preferred embodiments in accordance with the present invention.

FIG. 1 is an optical diagram schematically showing the composition of a scanning optical system 1 in accordance with an embodiment of the present invention. As shown in FIG. 1, the scanning optical system 1 includes a laser light source 10 which emits a plurality of laser beams, a collimating lens 11 which collimates the laser beams emitted by the laser light source 10 into parallel light beams, a cylindrical lens 12 which converges the laser beams emerging from the collimating lens 11 only in an auxiliary scanning direction (which will be explained later), a polygon mirror 13 as a deflecting system revolving about its central axis formed in the shape of a regular polygonal prism having lateral faces serving as reflecting surfaces for reflecting the laser beams, and a second optical system 20 which converges the laser beams dynamically deflected by a reflecting surface of the revolving polygon mirror 13. The laser beams converged by the second optical system 20 are converged on the circumferential surface of a photoconductive drum serving as the scan target surface S.

Incidentally, for the sake of easy and clear understanding of the following explanation, the "auxiliary scanning direction" is basically defined as a direction parallel to the central axis 13a of the polygon mirror 13, and the "main scanning direction" is basically defined as a direction orthogonal to the auxiliary scanning direction or the direction of main scan by the polygon mirror 13. The "main scanning direction" can be defined not only at the polygon mirror 13 but also at any point on the optical path of each laser beam, as a direction regarding the main scan of the laser beam, that is, the direction in which the laser beam is dynamically deflected by the polygon mirror 13 or the direction in which the laser beam moves according to the revolution of the polygon mirror 13. The "auxiliary scanning direction" can also be defined at any point on the optical path of each laser beam as a direction orthogonal to the main scanning direction.

The laser light source 10 is a monolithic multibeam laser diode composed of one light emitting element which emits a plurality of laser beams (as diverging beams) from a plurality of light emitting points aligned in the auxiliary scanning direction (vertical direction in FIG. 1) respectively.

The collimating lens 11 is placed so that its front focal point coincides with the midpoint of a line connecting the light emitting points of the laser light source 10. Therefore, the laser beams emitted from the light emitting points as diverging beams are collimated by the collimating lens 11 into parallel light beams and thereafter travel so as to intersect with one another at the rear focal point of the collimating lens 11.

Each laser beam incident upon the cylindrical lens 12 passes therethrough and focuses, in the auxiliary scanning direction, on a focal plane of the cylindrical lens 12, which is a plane containing the rear focal point (line) of the cylindrical lens 12 and orthogonal to the optical axis of the collimating lens 11.

The polygon mirror 13 is arranged so that each laser beam emerging from the cylindrical lens 12 will be constantly incident upon one of its reflecting surfaces obliquely in the main scanning direction. Further, the laser beam will focus in the auxiliary scanning direction in the vicinity of the reflecting surface. Since the polygon mirror 13 revolves about its central axis 13a (see FIGS. 2 and 5), the incident angle of each laser beam on a reflecting surface of the polygon mirror 13 (with respect to the reflecting surface) measured in the main scanning direction changes as the polygon mirror 13 revolves, by which each laser beam is dynamically deflected within a certain angular range in the main scanning direction.

Each laser beam dynamically deflected by the polygon mirror 13 travels toward the second optical system 20 as a parallel light beam in the main scanning direction and as a diverging light beam in the auxiliary scanning direction from the focusing point in the vicinity of the reflecting surface, and enters the second optical system 20.

The second optical system 20 focuses each incident laser beam in the main scanning direction at a position on the scan target surface S, which is a distance $y=k \cdot \theta$ (k: scan coefficient, $\theta$: tilt angle of the laser beam relative to the optical axis) apart from the optical axis while focusing each incident laser beam in the auxiliary scanning direction on the scan target surface S inverting its position in the auxiliary scanning direction with respect to the optical axis.

Therefore, each beam spot formed on the scan target surface S by each laser beam scans the scan target surface S in the main scanning direction at a constant speed. Each reflecting surface of the polygon mirror 13 and the scan target surface S are set substantially in an optically conjugate relationship with each other in the auxiliary scanning direction by the second optical system 20, by which each laser beam consistently scans on the same line on the scan target surface S regardless of which reflecting surface of the polygon mirror 13 reflects the laser beam, irrespective of the presence or absence of a facet error (i.e., slight tilt of each reflecting surface).

Specifically, the second optical system 20 is composed of a first lens 21, and a second lens 22 which is placed nearer to the scan target surface S than the first lens 21. The first lens 21 has refractive power for converging each laser beam mainly in the main scanning direction, while the second lens 22 has refractive power for converging each laser beam mainly in the auxiliary scanning direction.

The optical axis of the second optical system 20 overlaps, in the main scanning direction, with the chief ray of each laser beam reflected at the center of a reflecting surface of the polygon mirror 13. In regard to the auxiliary scanning direction, the optical axis of the second optical system 20 crosses the central axis 13a of the polygon mirror 13 at right angles.

There are cases where a lens surface of the lens 21 or 22 forming the second optical system 20 is a rotationally asymmetrical aspherical surface (i.e., aspherical surface with no rotational symmetry). In such cases, the term "optical axis" in its original meaning can not be defined for such a lens surface. Therefore, the term "optical axis" will hereinafter be used in the meaning of an axis (optical surface reference axis) that passes through an origin of an optical surface, the origin being set when the configuration of the optical surface is expressed by an equation. Further, hereinafter, a cross section taken along a plane containing the optical axis and parallel to the main scanning direction will be referred to a "main scanning cross section", and a cross section take along a plane containing the optical axis and parallel to the auxiliary scanning direction will be called an "auxiliary scanning cross section".

If an error in the auxiliary scanning direction occurs in the shapes or assembly of the optical elements, the magnification of the whole scanning optical system 1 changes. For example, if the cylindrical lens 12 as an element of the first optical system has a focal length error from a design focal length, the magnification of the first optical system changes and thereby the magnification of the whole scanning optical system 1 changes. Similarly, if the position of first lens 21 or second lens 22 as an element of the second optical system 20 shifts in the optical axis direction from a design position, the magnification of the second optical system 20 changes and thereby the magnification of the whole scanning optical system 1 changes. Such change in the magnification of the whole scanning optical system 1 from a design magnification causes a change in the laser beam interval on the scan target surface S in the auxiliary scanning direction (beam spot interval) from a design interval. An error in the interval between the light emitting points of the laser light source 10 also affects the beam spot interval.

To eliminate the problems, in this embodiment, the second lens 22 of the second optical system 20 is implemented by a single lens whose design magnification "mP" (magnification of the second lens 22 at its design reference position with respect to an image formed by the first lens 21) on the auxiliary scanning cross section is approximately −1 (−1.15<mP <−0.80) and whose design magnification "mS" on the main scanning cross section is approximately +1 (0.80<mS<1.15), and the magnification on the auxiliary scanning cross section is changed by slightly moving the second lens 22 in the optical axis direction from the design reference position, by which the aforementioned error in the laser beam interval on the scan target surface S in the auxiliary scanning direction (beam spot interval error), caused by the magnification error of the whole scanning optical system 1 and the light emitting point interval error, is corrected. As above, the magnification of the whole scanning optical system 1 in the auxiliary scanning direction can be adjusted by moving the second lens 22.

Since the design magnification mP of the second lens 22 on the auxiliary scanning cross section is approximately −1 (−1.15<mP<−0.80), even if the magnification of the second lens 22 on the auxiliary scanning cross section is changed by moving the second lens 22 in the optical axis direction, moving distance of the focal position on the auxiliary scanning cross section caused by the change becomes approximately 0. Further, since the design magnification mS of the second lens 22 on the main scanning cross section is approximately +1 (0.80<mS<1.15), even if the magnification of the whole scanning optical system 1 on the auxiliary scanning cross section is changed by moving the second lens 22 in the optical axis direction, the focal position on the main scanning cross section does not move and the magnification of the whole scanning optical system 1 on the main scanning cross section does not change. Therefore, in spite of the simple composition in which only one lens (second lens 22) is moved in the optical axis direction, there is no need of extra adjustment such as readjustment of the focal position. Incidentally, if the design magnification mP of the second lens 22 on the auxiliary scanning cross section deviates from the above range (−1.15<mP<−0.80), the change in the focal position on the auxiliary scanning cross section accompanying the movement of the second lens 22 in the optical axis direction becomes too large. Similarly, if the design magnification mS of the second lens 22 on the main scanning cross section deviates from the above range (0.80<mS<1.15), the change in the focal position on the main scanning cross section accompanying the movement of the second lens 22 in the optical axis direction becomes too large.

In the following, two specific examples of the scanning optical system 1 according to this embodiment will be described in order to verify that the movement of the second lens 22 in the optical axis direction causes substantially no change in the focal position on the main scanning cross section and the focal position on the auxiliary scanning cross section as long as the aforementioned design magnification conditions (−1.15<mP<−0.80, 0.80<mS<1.15) of the second lens 22 on the auxiliary scanning cross section and the main scanning cross section are satisfied.

EXAMPLE 1

Figure 2:
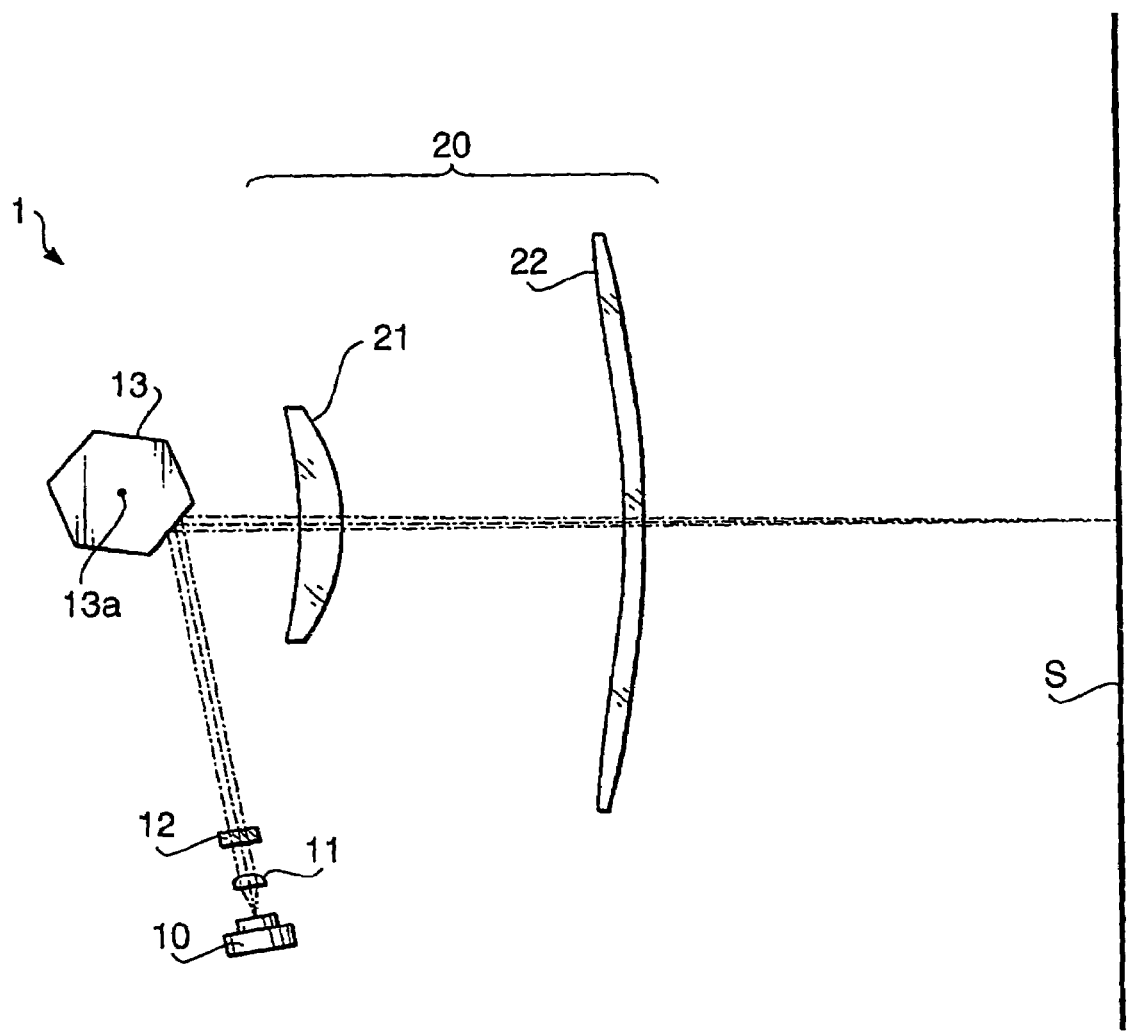
FIG. 2 is an optical block diagram of a scanning optical system of a first example of the embodiment seen in an auxiliary scanning direction.

FIG. 2 shows an optical configuration of a scanning optical system 1 of a first example of the embodiment seen in the auxiliary scanning direction.

In the first example, the focal length of the whole second optical system 20 on the main scanning cross section is 219.885 mm.

The following Table 1 shows specific numerical configuration of each optical surface of the scanning optical system 1 of the first example on the optical path from the cylindrical lens 12 to the scan target surface S.

TABLE 1

| Surface No. | r | d | n | vd |
|---|---|---|---|---|
| #0 | ∞ | 35.0 | | |
| #1 | −165.0 | 12.0 | 1.486 | 57.4 |
| #2 | −62.5 | 80.0 | | |
| #3 | −250 | 5.0 | 1.486 | 57.4 |
| #4 | −400 | 134.0 | | |
| #5 | ∞ | — | | |

In Table 1, each number in the column "SURFACE NO." denotes a surface number of each optical surface in the latter part of the scanning optical system 1, in which "0" denotes the deflecting surface (each reflecting surface of the polygon mirror 13), "1" denotes the front lens surface of the first lens 21, "2" denotes the rear lens surface of the first lens 21, "3" denotes the front lens surface of the second lens 22, "4" denotes the rear lens surface of the second lens 22, and "5" denotes the scan target surface S. The symbol "r" denotes the paraxial curvature radius [mm] of the optical surface, "d" denotes the distance from the optical surface to the next optical surface on the optical axis [mm], "n" denotes the refractive index of a medium between the optical surface and the next optical surface at a design wavelength 780 nm (omitted for air), and "vd" denotes the Abbe number of the medium.

The front and rear lens surfaces of the first lens 21 (surface No. 1 and No. 2) and the front lens surface of the second lens 22 (surface No. 3) are rotationally symmetric aspherical surfaces. Therefore, the sectional form of each of the lens surfaces No. 1, No. 2 and No. 3 (rotationally symmetric aspherical surface) is expressed by the following equation (1):

$$X(h) = \frac{\frac{1}{r}h^2}{1+\sqrt{1-\frac{(\kappa+1)^2 h^2}{r^2}}} + A_4 h^4 + A_6 h^6 + A_8 h^8 \quad (1)$$

where X(h) denotes a SAG amount of a point on the lens surface whose height (distance) from the optical axis is h (SAG amount: distance measured from a tangential plane contacting the lens surface on the optical axis), "r" denotes the paraxial radius of curvature shown in Table 1, "κ" denotes a conical constant, and "$A_4$", "$A_6$" and "$A_8$" denote aspherical coefficients of fourth, sixth and eighth orders. The coefficients employed in the first example for the equation (1) for specifying the particular shape of the lens surface No. 1 (front lens surface of the first lens 21) will be shown in the following Table 2.

TABLE 2

| κ | $A_4$ | $A_6$ | $A_8$ |
|---|---|---|---|
| 0.000 | −8.000E−09 | 7.400E−11 | 0.000E+00 |

Similarly, the coefficients for specifying the particular shape of the lens surface No. 2 (rear lens surface of the first lens 21) will be shown in the following Table 3.

TABLE 3

| κ | $A_4$ | $A_6$ | $A_8$ |
|---|---|---|---|
| 0.000 | −3.790E−07 | 1.000E−10 | 0.00E+00 |

Similarly, the coefficients for specifying the particular shape of the lens surface No. 3 (front lens surface of the second lens 22) will be shown in the following Table 4.

TABLE 4

| κ | $A_4$ | $A_6$ | $A_8$ |
|---|---|---|---|
| 0.000 | 1.730E−07 | −5.800E−12 | 0.000E+00 |

The rear lens surface of the second lens 22 (surface No. 4) is an anamorphic aspherical surface (aspherical surface whose shape on the main scanning cross section is defined by a function of the distance from the optical axis measured in the main scanning direction and whose shape on each plane parallel to the auxiliary scanning cross section is an arc with a curvature defined by a function of the distance from the optical axis measured in the main scanning direction). Therefore, the sectional form of the lens surface on the main scanning cross section is expressed by the following equation (2) in terms of the SAG amount (X(y)) of each point having a height y (distance measured in the main scanning direction) from the optical axis, and the shape of the lens surface in the auxiliary scanning direction at the height y in the main scanning direction is expressed by the following equation (3) in terms of curvature 1/[Rz(y)] of an arc.

$$X(y) = \frac{\frac{1}{r}y^2}{1+\sqrt{1-\frac{(\kappa+1)^2 y^2}{r^2}}} + AM_4 y^4 + AM_6 y^6 + AM_8 y^8 \quad (2)$$

$$\frac{1}{Rz(y)} = \frac{1}{Rz} + AS_1 y + AS_2 y^2 + AS_4 y^4 + AS_6 y^6 \quad (3)$$

where "r" denotes the paraxial curvature radius shown in Table 1, Rz denotes a paraxial curvature radius in the auxiliary scanning direction, "κ" denotes a cone constant, "$AM_4$", "$AM_6$" and "$AM_8$" denote aspherical coefficients of fourth, sixth and eighth orders regarding the main scanning direction, and "$AS_1$", "$AS_2$", "$AS_4$" and "$AS_6$" denote aspherical coefficients of first, second, fourth and sixth orders regarding the auxiliary scanning direction. The above coefficients employed in the first example for the equations (2) and (3) for specifying the particular shape of the lens surface No. 4 (rear lens surface of the second lens 22) will be shown in the following Table 5.

TABLE 5

| κ | $AM_4$ | $AM_6$ | $AM_8$ | |
|---|---|---|---|---|
| 0.000 | 0.000E+00 | 0.000E+00 | 0.000E+00 | |
| Rz | $AS_1$ | $AS_2$ | $AS_4$ | $AS_6$ |
| +29.70 | 2.350E−06 | 1.570E−06 | −1.180E−10 | 4.450E−05 |

From the above values of the coefficients, the design magnification mS of the second lens 22 of the first example on the main scanning cross section is calculated as mS=+1.103, and the design magnification mP of the second lens 22 on the auxiliary scanning cross section is calculated as mP=−0.942.

Figure 3:
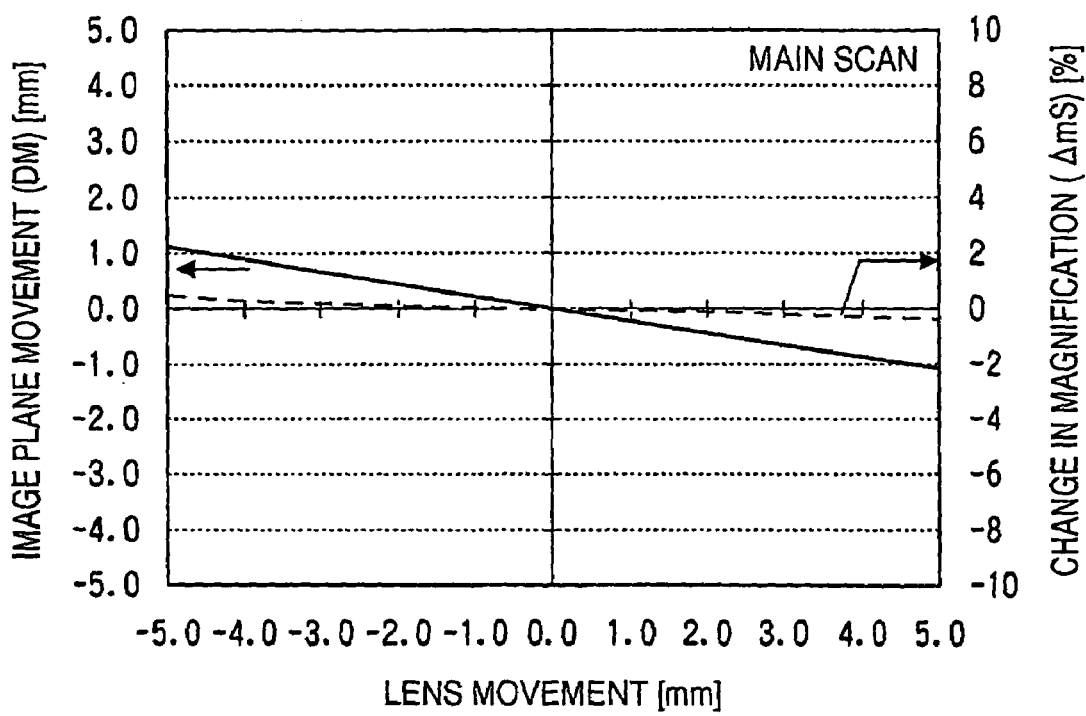
FIG. 3 is a graph showing changes in the position of image plane and the magnification on a main scanning cross section when a magnification adjustment element of the scanning optical system of the first example is moved.

FIG. 3 is a graph showing changes in the position of image plane and the magnification on the main scanning cross section when the second lens 22 is moved, in which the horizontal axis represents moving distance of the second lens 22 from the design position along the optical axis (negative values: in front of the design position, positive values: behind the design position) and the vertical axes represent moving distance DM (solid line) of the image plane (the change in the image plane position) and the change ΔmS (dashed line) in the magnification on the main scanning cross section. Similarly, FIG. 4 is a graph showing changes in the image plane position and the magnification on the auxiliary scanning cross section when the second lens 22 is moved, in which the horizontal axis represents the moving distance of the second lens 22 and the vertical axes represent moving distance DS (solid line) of the image plane and the change ΔmP (dashed line) in the magnification on the auxiliary scanning cross section.

Figure 4:
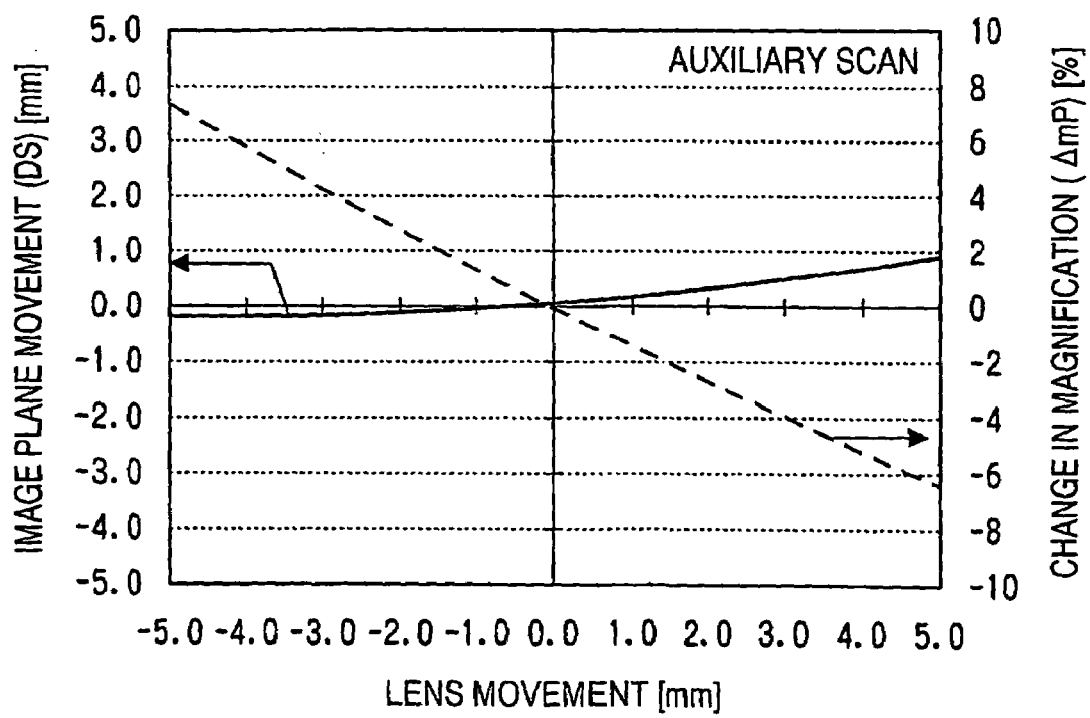
FIG. 4 is a graph showing changes in the image plane position and the magnification on the auxiliary scanning cross section when the magnification adjustment element in the first example is moved.

As is clear from FIGS. 3 and 4, by the first embodiment, even if the change ΔmP in the magnification of the whole scanning optical system 1, on the auxiliary scanning cross section, is adjusted within a range of approximately ±7% by moving the second lens 22 forward or backward within a range of ±5.0 mm, the change ΔmS in the magnification of the whole scanning optical system 1 on the main scanning cross section is at most 0.5%, and the image plane moving distance DM on the main scanning cross section and the image plane moving distance DS on the auxiliary scanning cross section are at most approximately 1 mm.

EXAMPLE 2

Figure 5:
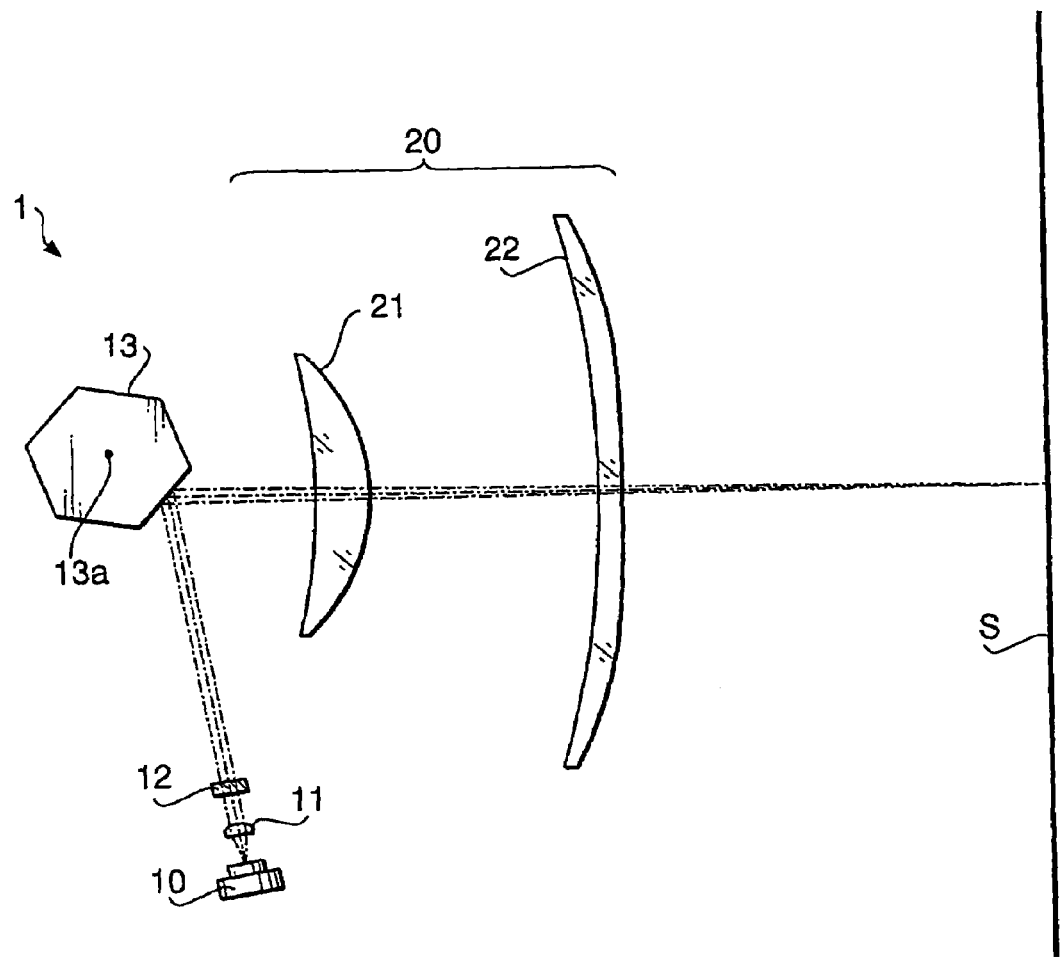
FIG. 5 is an optical block diagram of a scanning optical system of a second example of the embodiment seen in the auxiliary scanning direction.

FIG. 5 is an optical configuration of a scanning optical system 1 of a second example of the embodiment seen in the auxiliary scanning direction.

In the second example, the focal length of the whole second optical system 20 on the main scanning cross section is 199.914 mm.

The following Table 6 shows specific numerical configuration of each optical surface of the scanning optical system 1 of the second example on the optical path from the cylindrical lens 12 to the scan target surface S.

TABLE 6

| Surface No. | r | d | n | νd |
|---|---|---|---|---|
| #0 | ∞ | 45.0 | | |
| #1 | −278.4 | 16.0 | 1.486 | 57.4 |
| #2 | −69.6 | 69.4 | | |
| #3 | −419.7 | 7.0 | 1.486 | 57.4 |
| #4 | −798.0 | 124.9 | | |
| #5 | ∞ | — | | |

In Table 6, each symbol has the same meaning as that in Table 1. The front lens surface of the first lens 21 (surface No. 1) is a rotationally symmetric aspherical surface. The coefficients employed in the second example for the equation (1) for specifying the particular shape of the lens surface No. 1 will be shown in the following Table 7.

TABLE 7

| κ | $A_4$ | $A_6$ | $A_8$ |
|---|---|---|---|
| 0.000 | −3.856E−07 | 1.073E−10 | −1.991E−14 |

The rear lens surface of the first lens 21 (surface No. 2) is a cylindrical surface having refractive power in the main scanning direction. The curvature radius Rz of the lens surface No. 2 on the auxiliary scanning cross section is infinite.

The front lens surface of the second lens 22 (surface No. 3) is an anamorphic aspherical surface. The coefficients employed in the second example for the equations (2) and (3) for specifying the particular shape of the lens surface No. 3 will be shown in the following Table 8.

TABLE 8

| κ | $AM_4$ | $AM_6$ | $AM_8$ | |
|---|---|---|---|---|
| 0.000 | 1.191E−08 | −9.874E−12 | 6.365E−16 | |
| Rz | $AS_1$ | $AS_2$ | $AS_4$ | $AS_6$ |
| +31.72 | −1.771E−06 | −1.436E−06 | 5.557E−11 | 0.000E+00 |

The rear lens surface of the second lens 22 (surface No. 4) is a rotationally symmetric aspherical surface. The coefficients employed in the second example for the equation (1) for specifying the particular shape of the lens surface No. 4 will be shown in the following Table 9.

TABLE 9

| κ | $A_4$ | $A_6$ | $A_8$ |
|---|---|---|---|
| 0.000 | −1.174E−07 | −3.416E−12 | 2.316E−16 |

From the above values of the coefficients, the design magnification mS of the second lens 22 of the second example on the main scanning cross section is calculated as mS=+1.047, and the design magnification mP of the second lens 22 on the auxiliary scanning cross section is calculated as mP=−1.058.

Figure 6:
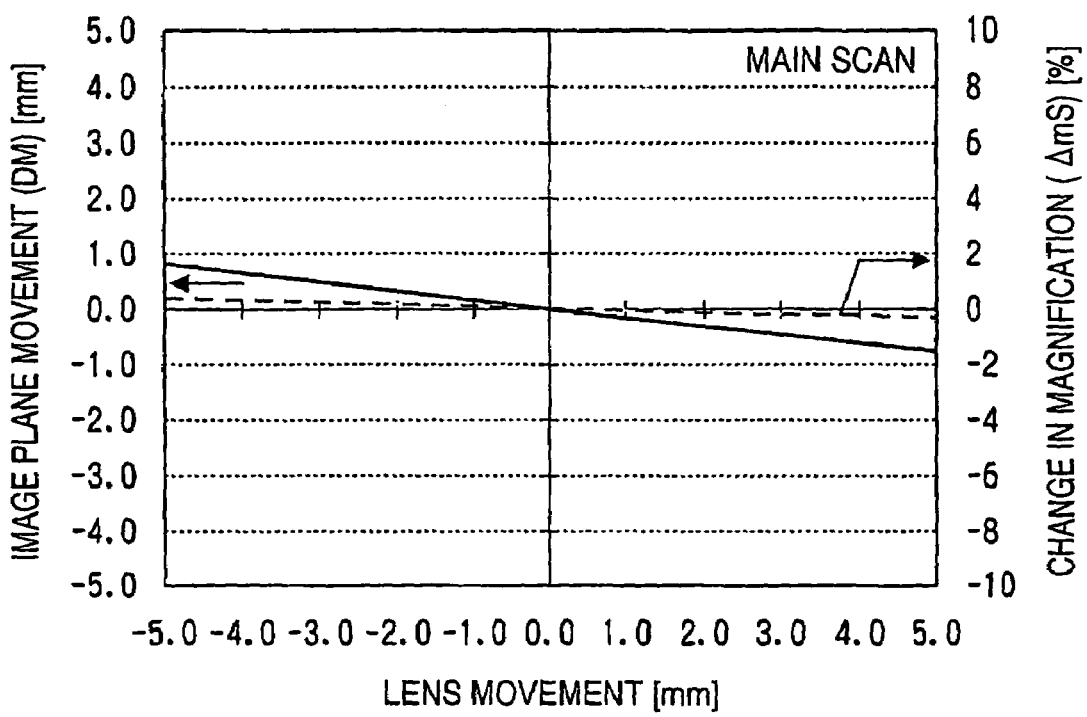
FIG. 6 is a graph showing the changes in the image plane position and the magnification on the main scanning cross section when a magnification adjustment element of the scanning optical system of the second example is moved.

FIG. 6 is a graph showing the changes in the image plane position and the magnification on the main scanning cross section when the second lens 22 is moved, in which the horizontal axis represents the moving distance of the second lens 22 and the vertical axes represent the image plane moving distance DM (solid line) and the change ΔmS (dashed line) in the magnification on the main scanning cross section. Similarly, FIG. 7 is a graph showing the changes in the image plane position and the magnification on the auxiliary scanning cross section when the second lens 22 is moved, in which the horizontal axis represents the moving distance of the second lens 22 and the vertical axes represent the image plane moving distance DS (solid line) and the change ΔmP (dashed line) in the magnification on the auxiliary scanning cross section.

Figure 7:
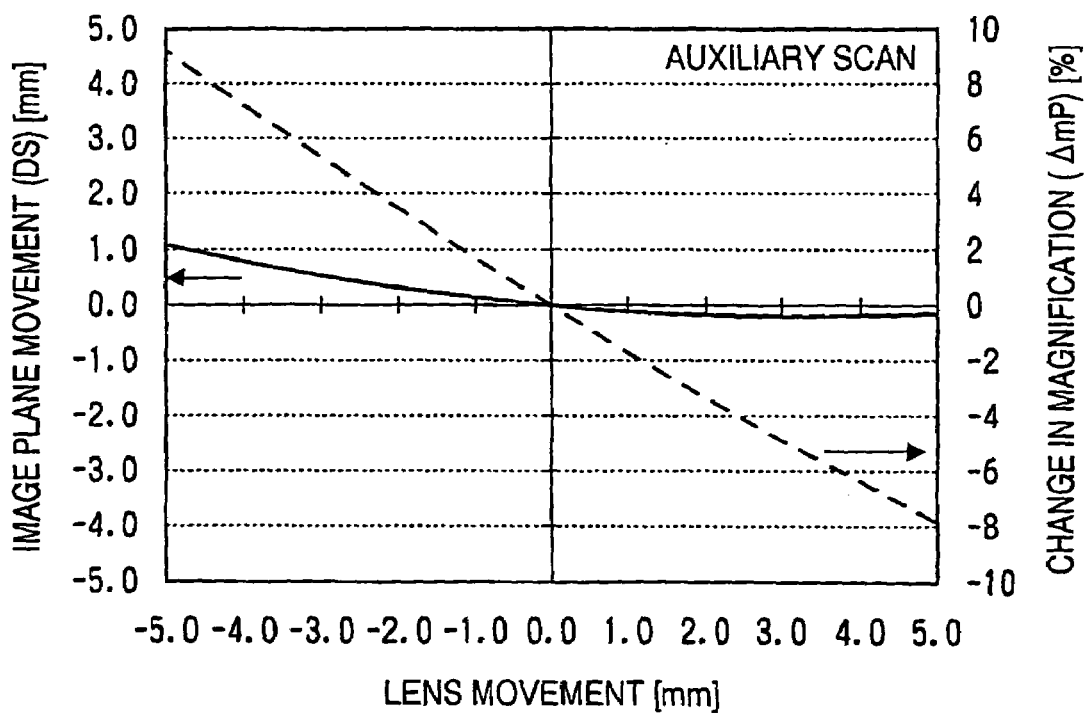
FIG. 7 is a graph showing the changes in the image plane position and the magnification on the auxiliary scanning cross section when the magnification adjustment element in the second example is moved.

As is clear from FIGS. 6 and 7, by the second embodiment, even if the change ΔmP in the magnification of the whole scanning optical system 1 on the auxiliary scanning cross section is adjusted within a range of approximately −8% through +9% by moving the second lens 22 forward or backward within a range of ±5.0 mm, the change ΔmS in the magnification of the whole scanning optical system 1 on the main scanning cross section is at most 0.3%, and the image plane moving distance DM on the main scanning cross section and the image plane moving distance DS on the auxiliary scanning cross section are at most approximately 1 mm.

As described above, by the scanning optical systems in accordance with the above embodiment of the present invention, the interval between the beams on the scan target surface S (scan line interval) can be adjusted properly only by moving a lens (magnification adjustment element) that is necessary for the original function of the scanning optical system, without the need of increasing the number of lenses or rotating the light emitting element.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The present disclosure relates to the subject matter contained in Japanese Patent Application No. 2003-274753, filed on Jul. 15, 2003, which is expressly incorporated herein by reference in its entirety.

What is claimed is:

1. A scanning optical system for scanning a plurality of beams, which are arranged in an auxiliary scanning direction, on a scan target surface in a main scanning direction, comprising:
  a light source having a plurality of light emitting points each of which emits a beam;

a first optical system that collimates the beams emitted by the light emitting points in regard to the main scanning direction while converging the beams in the auxiliary scanning direction;

a deflecting system that dynamically deflects the beams simultaneously in the main scanning direction; and a second optical system that converges the deflected beams on the scan target surface, wherein the second optical system includes a magnification adjustment element whose magnification mS in the main scanning direction on an optical axis thereof is approximately +1 and whose magnification mP in the auxiliary scanning direction on the optical axis thereof is approximately −1.

2. The scanning optical system according to claim 1, wherein the magnification mS of the magnification adjustment element on the optical axis in the main scanning direction satisfies:

0.80<mS<1.15.

3. The scanning optical system according to claim 1, wherein the magnification mP of the magnification adjustment element on the optical axis in the auxiliary scanning direction satisfies:

−1.15<mP<−0.80.

4. The scanning optical system according to claim 1, wherein the magnification adjustment element is placed nearest to the scan target surface among optical elements of the second optical system.

5. The scanning optical system according to claim 1, wherein the magnification adjustment element is configured to be movable in the direction of the optical axis.

6. The scanning optical system according to claim 1, wherein the second optical system includes a first lens having refractive power for converging each beam mainly in the main scanning direction and a second lens as the magnification adjustment element.

7. The scanning optical system according to claim 1, wherein the magnification adjustment element is implemented by a lens having a rotationally symmetric aspherical front surface and an anamorphic aspherical rear surface.

8. The scanning optical system according to claim 1, wherein the magnification adjustment element includes a lens having an anamorphic aspherical front surface and a rotationally symmetric aspherical rear surface.

* * * * *